Oct. 6, 1931.  M. BACINO  1,825,709
COIN OPERATED PHOTOGRAPHIC APPARATUS
Filed Sept. 25, 1929   7 Sheets-Sheet 1

Fig. 1

Inventor,
Mario Bacino

Oct. 6, 1931.                M. BACINO              1,825,709
              COIN OPERATED PHOTOGRAPHIC APPARATUS
                  Filed Sept. 25, 1929    7 Sheets-Sheet 4

Oct. 6, 1931.   M. BACINO   1,825,709
COIN OPERATED PHOTOGRAPHIC APPARATUS
Filed Sept. 25, 1929   7 Sheets-Sheet 6

Inventor,
Mario Bacino,
By Henry Orth
Atty.

Oct. 6, 1931. M. BACINO 1,825,709
COIN OPERATED PHOTOGRAPHIC APPARATUS
Filed Sept. 25, 1929 7 Sheets-Sheet 7

Inventor,
Mario Bacino,
By
Atty.

UNITED STATES PATENT OFFICE

MARIO BACINO, OF TURIN, ITALY

COIN-OPERATED PHOTOGRAPHIC APPARATUS

Application filed September 25, 1929, Serial No. 395,082, and in Italy September 26, 1928.

This invention has for its object a coin-operated photographic apparatus, by means of which it is possible to obtain successively a plurality of images to develop, fix, etc. and deliver the positive print to the photographed person, all these operations taking place one after another in a substantially continuous cycle.

In the apparatus according to this invention the above mentioned processes are carried out in a predetermined time succession and only some of them are to be effected by the person to be photographed. As soon as a coin has been introduced into the machine slot, a group of devices chiefly actuated by suitable electric circuits are set into operation while the user has only to press a key each time he is ready for the exposure and wishes to open the shutter. The number of said different exposures is predetermined and as soon as they have been effected the usual photographic operations and the delivery of the positive prints take place in a very short time.

One of the characteristic features of the invention consists in the fact that positives are produced from negatives by immersing the sensitive paper receiving the exposures transmitted by the objective in suitable solutions. Moreover the successive exposures are taken on the same sensitive sheet on one, two or more rows; said sheet being movable in both directions by means of suitable arrangements.

After exposure suitable means cause the sheet to fall into a rotating and vertically sliding frame, from which it passes in the different solutions for development, fixing, production of positives from negatives, rinsing etc. leaving at the end of these operations the paper still in a wet condition free to fall on a feeding device on which it is dried and then brought in a suitable position for being withdrawn by the client.

According to this invention the timed movement of the different devices is effected by means of electric apparatus put in a suitable circuit including an electric motor imparting rotation or rectilinear motion to the moving parts and a plurality of relays adapted to connect and disconnect at the due time elements of the circuit and their corresponding apparatus and one or more intermittently operated electromagnets; said circuit being initially closed by the introduction of a coin between conductive members, by which it is caused to fall automatically as soon as the exposures on the sensitive paper have been effected.

Said circuit includes also a key which when depressed by the person to be photographed will effect in succession the different exposures actuating at the same time a pointer which by rotating on a dial will show at the outside the progressive number thereof and the end of the series.

According to the invention the shutter uncovering at the due time the objective is provided on its periphery with a plurality of slots, the number of which is equal to the number of the exposures given by the machine for one coin; said shutter being moreover provided with stops some of which permit the intermittent rotation of said disk while others release the coin from its stops at the due time opening the corresponding circuit.

In combination with the shutter are arranged means for maintaining a part of the circuit, that is the part including the operating electric motor, closed even after the coin has fallen down and the relative circuit has been broken, so that once the exposure has been effected, the necessary operations in connection with the images may be proceeded with.

In order to ensure a well stretched position of the sensitive paper, this latter is held during the exposure against a movable frame acted upon by a suitable feeding mechanism which successively displaces the paper in one direction, while further devices displace the frame in a perpendicular direction with regard to the first one as the exposures are being taken; said displacements may be combined in groups and take place by turns.

When the exposure has been effected, the paper is removed from its supporting frame and is successively immersed by suitable gripping devices in a series of containers filled with the solutions known in the art of photography for the purposes specified, in which the paper undergoes the necessary treatment. At the end of said operation, suitable means set the paper free causing it to fall on a slow advancing feeder on which it is subjected to the action of an electric drying apparatus reaching the place of delivery in a finished state.

In combination with the above described arrangements means are also provided to maintain the chemical baths constantly at about the same temperature, for which purpose a suitable water jacket circulation may be used, while in other parts heating means for the winter and cooling means for the summer may be provided. Any suitable solution may be used in the apparatus which may be fitted in part with devices already known in automatic delivery apparatus generally, and more particularly in those applied to photography.

The invention will be clearly understood by the following description with reference to the annexed drawings which show by way of example a constructional form of the invention, it being understood that the invention is not limited to the same.

In said drawings.

In the illustrated construction the predetermined number of exposures that may be effected on each sensitive sheet is nine and the various devices and their operation will be described in connection with said number of exposures.

It is to be understood that although "sensitive paper", is referred to this may also include a metallic frame on which it may be supported or a plate may be used instead of the paper.

Referring to Figs. 1–13 of the drawings, numeral 1 denotes a prismatic box perfectly light-tight and darkened internally which constitutes the dark chamber and is provided with a nonillustrated inspection door for removal and replacement of the photographic solutions, for renewing the supply of sensitive paper as well as for the up-keep and lubrication of the mechanisms contained in the box. This latter has strong walls to give the necessary stiffness to the whole of the apparatus and said walls may be coated with a heat-insulating material in order to protect the inner part against outer temperature.

These details however are not illustrated in the drawings.

The box is subdivided into two compartments by a partition 1a supporting the baths, while on the box bottom (Fig. 1) is located an electric motor 2, which imparts rotation to a cam disk 4 through two worm reducing gears 3 the cam 5 of said disk having a higher boss while the cams 6 have a lower boss. The rotation of said disk transmits through a lever 7 hinged at 8 a strong up and down movement to the shaft 9 on operation of the boss 5 or slight oscillations on operation of the bosses 6. On the shaft 9 is keyed a wheel 9a, on the upper rim of which saw-teeth are cut corresponding in number to the crates 11, and engaging a pawl 9b articulated on a bush 9c and secured to the partition 1a. It is thus apparent that when the shaft 9, is near the end of its upward stroke, the pawl 9b is engaged by the teeth of the wheel 9a, and the shaft is caused to rotate through a certain predetermined angle.

Figure 1:
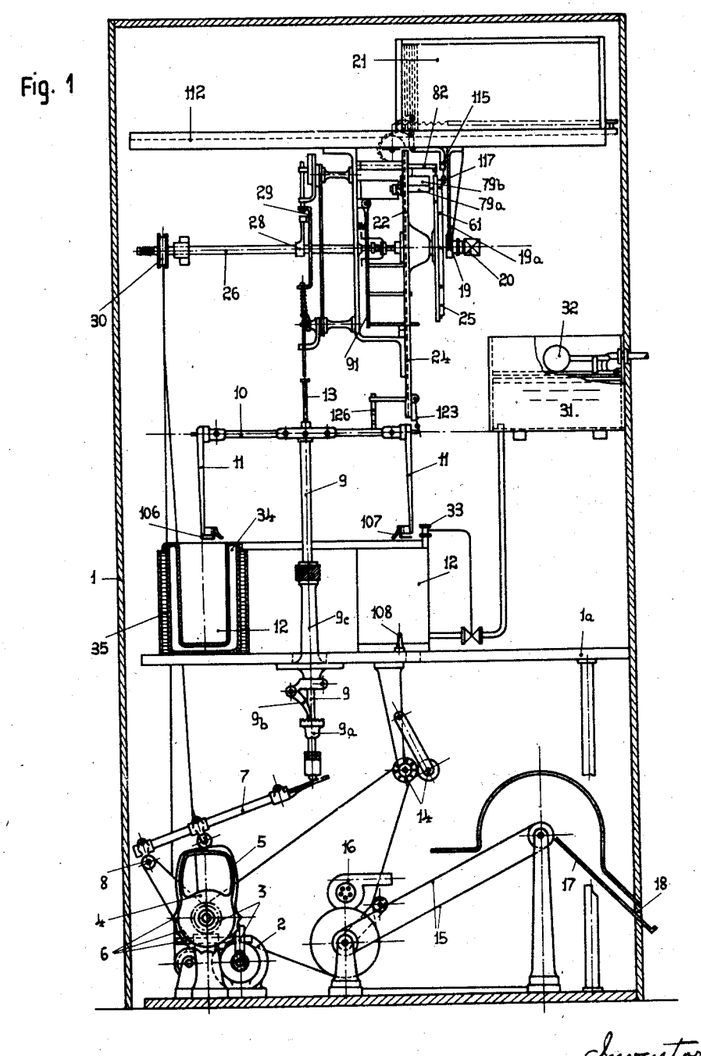
Fig. 1 is an elevation partially in section of the whole apparatus.

On the upper end of the shaft 9 is keyed a spider 10, to which are hung gripping frames or crates 11, which in the illustrated construction are in number of eight and are adapted to collect the exposed sheets and to dip them successively into the photographic baths contained in the trays 12. The shaft 9 is provided with an extension 13 for actuating an electric contact device 29 that will be hereafter more particularly described.

The motor 2 sets in rotation by means of loose pulleys and belts two rollers 14 that receive the paper already fixed and washed from the crates 11 and are coated with absorbing material, for removing from the photographs any water drops still adhering thereto. After passing through the rollers 14, the photographs fall on the band conveyor 15 (also suitably actuated by the electric motor), on which they are subjected to a hot air current produced by an electric apparatus 16 and are carried to the top of an incline 17 along which they slide to the outside through a slot 18.

The front wall of the box has a hole registering with the objective 19 and permitting exposure of the sensitive sheets. The objective 19 is supported on a bracket 19—a and one or more prisms 20 are arranged before the objective for rectifying the images.

The sensitive sheets are stored in a receptacle 21, which is caused to advance intermittently by a device that will be described hereafter and by means of which the sheets fall one by one at the due time into a frame 22, which during exposure is conveniently displaced with respect to the objective 20. The bar 91 by means of three projections of different length allows the paper to move vertically downwards and finally to fall between the guides 24 that place the sheet in one of the crates 11.

A shutter 25 is arranged behind the objective 19 (Figs. 1 and 2) and consists of a disk keyed on the shaft 26 and having a plurality of radial slots 60 (9 in the construction shown) and projections 61 suitably positioned acting as cams, which produce, as it will be hereafter described, the movement of the frame 22, the forward movement of the box 21 and the fall of the coin after the 9 exposures have been effected.

A swing lever 98 is swivelled on the shaft 26 and operates the oscillating rod 91 in the manner hereinafter described. The shaft 26 carries also a cam 28 (Figs. 1 and 2) actuating the electric contact 29. Said shaft may be caused to rotate by means of a pulley 30 actuated by the motor 2, and frictionally keyed on the shaft 26 in order to rotate this latter only when the shutter 25 is free to rotate through a certain angle having been disengaged from its stop members.

A water vessel 31 arranged within the box 1 communicates with the water main and is maintained at a constant level by means of a float 32. Said vessel 31 communicates through a heat regulator 33 with the jacket 34 surrounding the trays containing the photographic baths, for the purpose of maintaining the solutions at a constant temperature, while a felt layer 35 insulates the whole system against the outer temperature.

Figure 2:
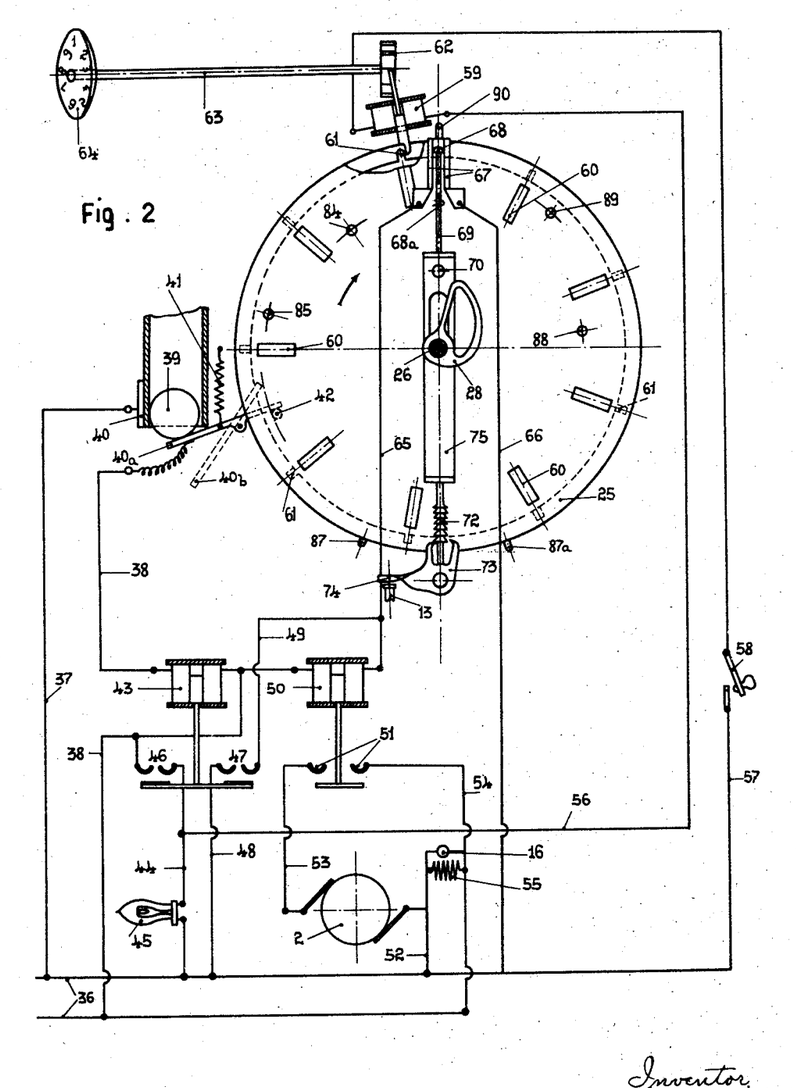
Fig. 2 is a diagram of the electric connections.

Referring to Fig. 2 which shows a diagram of the electric connections, the conductors 36 supply the current from the feeding line and a circuit 37—38 extending from said conductors is closed by the contact established by the coin 39 that electrically connects the contact 40 and plate 40a. The plate 40a oscillates on its pivot and is moved into the position 40b (thus letting the coin fall down and breaking the circuit 37—38) through the rotation of a cam 42 keyed on the shutter 25;

a spring 41 opposing said rotation and returning the plate into the position 30a as soon as the cam 42 has performed its function. The arrangement is such that the coin will fall down at the end of each full turn of the shutter.

When the circuit 37—38 is closed, the current flows through a relay 43, which, attracting its armature, closes the circuit 38—44 by means of the contacts 46, said circuit including a powerful lamp 45 adapted to throw light on the subject. The relay 43 further closes by the contacts 47 the circuit 38—48—49 and energizes the relays 50, which in its turn by attracting its armature by means of the contacts 51 closes the circuit 52—53—54 including the motor 2 and on which the resistance 55 and the motor of the fan 16 for the paper drying apparatus are shunted.

The closure of the contact 46 also establishes the circuit 38—56 including the electromagnet 59, switch 58, conductor 57, so that, when the person to be photographed presses the button 58, the electromagnet 59 attracts its armature and disengages one of the stops 61 of the shutter 25, which will thus be in a condition to be rotated by the shaft 26 (Fig. 1) through the ninth part of a turn allowing the light to pass through one of the slots 60 and causing the objective 19 to expose the sensitive paper producing a picture. The movement of the armature of the electromagnet 59 causes also through a suitable tappet the toothed wheel 62 to be displaced through the ninth part of a turn; said wheel being keyed on the axis 63 causes the disk 64, also keyed on the shaft 63 and carrying the numbers 1 to 9, to effect a corresponding rotation. The person being photographed can read through a slot the number of exposures that have already been taken.

When the nine exposures have been effected the shutter 25 has accomplished a complete revolution whereupon the cam 42 causes the coin to fall down thus opening the circuit 37—38 and contacts 46—47. At this time the photographs have been taken; but the sensitive paper is still to be treated and the prints delivered. It is therefore necessary for the motor to turn further independently of the action of the coin and for this purpose an auxiliary circuit 38 is made use of, said circuit including a relay 50, conductor 65, contacts 67, sliding terminal 68, conductor 66. The metallic sliding terminal 68 which connects the two contacts 67 for closing the circuit is connected by means of the rod 69 to the slider 75, which is capable of a downward sliding movement controlled by a gear consisting of a ratch 72 and pawls 73 which oscillate under the action of a lever 74, which on its turn receives the movement from the rod 13 (Fig. 1). The cam 28 is keyed, as it has already been said, on the shaft 26 so that when the coin 39 falls down opening the circuit, the cam is in the raised position having lifted a pin 70 secured to the slider 75 and the terminal 68 thus closing the auxiliary circuit through the contacts 67. The cam 28 however passes beyond the diametral line and the slider 75 is allowed to move slowly downwards under the action of the ratch gear 72, 73, which is designed in such a way that, when the slider has sunk to the point at which the terminal 68 is at 68a disconnecting the contacts 67, the corresponding circuit has been broken stopping definitely the motor 2. Therefore the machine always stops a certain time after the last exposure independently of the pictures already being developed.

Figures 7, 8, 10:
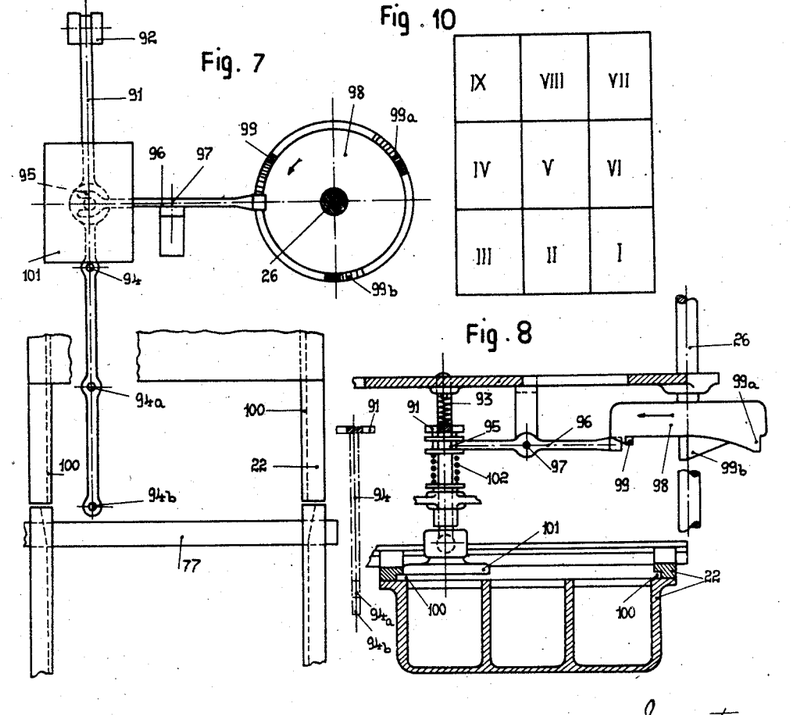
Figs. 7 and 8 are a partially sectional elevation and a plan view respectively showing on an enlarged scale the devices moving the sensitive paper in one direction before the objective during exposure.
Fig. 10 shows the sequence in which the exposures are effected on the sensitive paper.

The arrangements producing the horizontal and vertical displacements of the sensitive sheet during the nine exposures will now be described. The sequence of the exposures is shown in Fig. 10.

The movable frame 22 (Figs. 3, 4, 5, 6) slides by means of the rollers 71 along a fixed support 76 and is guided at its lower end by the slider 77. The frame 22 is constantly urged to the left by a spring 78 and carries above an angle bar 22a provided with two projections 79a and 79b on one side and with three upper teeth 80a—80b—80c of gradually increasing height, which engage a stop tooth 81 carried by the lever 82 oscillating on its pivot 83. The projections 79a and 79b and the ends of the lever 82 are actuated by the cams 84, 85, 87, 87a, 88, 89, 90 suitably arranged on the rim of the shutter 25 and of different length.

Figure 3:
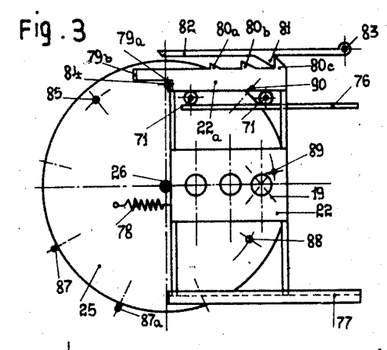
Figs. 3, 4, 5 and 6 show the different positions before the objective into which the paper is brought during exposure by the feeding apparatus.
Figure 4:
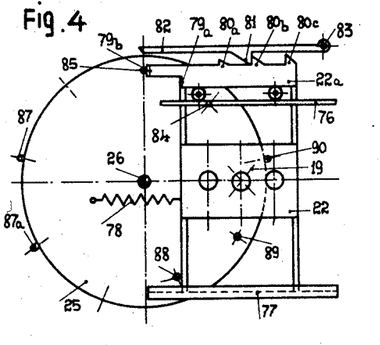

Fig. 3 shows diagrammatically the position of the frame 22 relatively to the shutter 25 when the photograph I has been taken (the objective 19 is indicated by a conventional reference X which shows its position). To take the photograph 2 the key 58 is depressed (Fig. 2) so that the shutter 25 may turn through the ninth part of a turn. The cam 84 is then engaged against the projection 79a forcing the frame 22 to the right by one third of its length and causing it to assume the position shown in Fig. 4. The spring 78 tends to return the frame 22 into the position of Fig. 3 but is prevented therefrom by the stop 81, which has meanwhile released the tooth 80c and engaged the next tooth 80b.

Figure 5:
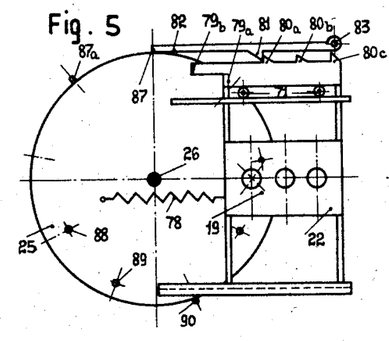
Figure 6:
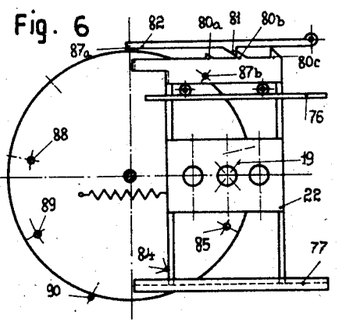

The II photograph is thus obtained and the third is taken as the shutter rotates further through 1/9 of a turn under the action of the cam 85 that has become engaged with the projection 79b and moves the frame 22 into the position shown in Fig. 5. In this case the spring action is opposed by the stop 81 engaging the tooth 80a.

At this point, an arrangement that will be described hereafter, lowers the paper by one third of its width, and photograph IV is obtained above photograph III. To obtain the photograph V, the frame must be moved by one third towards the left. To obtain this, a cam 87, upon rotation of the shutter, raises the lever 82 by the extent necessary for the passage of the lower tooth 80a. The spring 78 then comes into action and displaces the frame 22 to the left, until its action is stopped by the engagement of the stop 81 with the tooth 80b. The frame is thus brought to the position illustrated in Fig. 6.

The photograph V having thus been taken, in order to effect the VI photograph, another cam 87a higher than the cam 87, raises the lever 82 further thus letting the spring return the frame into the position shown in Fig. 3 ready to receive the photograph VI.

At this point there will be a further downward movement of the paper to effect photograph VII. Photographs VIII and IX are obtained by displacing again towards the right the frame 22 by means of the cams 88 and 89, that will successively engage the projections 79a and 79b like the previous cams 84 and 85 for the photographs II and III.

The IX and last photograph having been taken, the exposed paper falls from the frame into one of the crates 11 and the movable frame is returned to the position shown in Fig. 3 ready to receive a new sheet of sensitive paper for the exposure No. 1, said movement being effected by the cam 90 raising the lever 82 to the necessary extent so that the teeth 80a and 80b do not engage the stop 81.

Figures 9, 11, 12, 13:
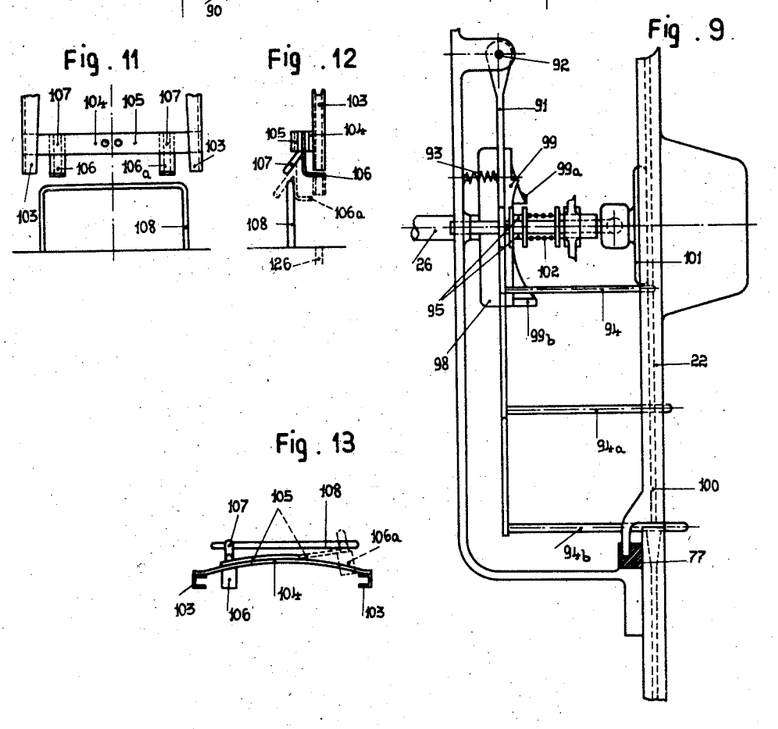
Fig. 9 shows also on an enlarged scale a side view of said devices.
Figs. 11, 12 and 13 show in front, plan and side view respectively, the device releasing the paper from the gripping means after it has been dipped into the photographic baths.

Figs. 7, 8 and 9 show the arrangement permitting the vertical movement of the sheet within the frame 22 to pass from the series of photographs I, II, III successively to the row IV, V, VI and VII, VIII, IX and the fall of the fully exposed sheet.

Said arrangement is constituted by a bar 91 oscillating on its pivot 92 and acted upon by a spring 93. On said rod are perpendicularly mounted at a suitable height the rods 94, 94a, 94b of increasing length. On the front surface of the oscillating bar 91 acts a forked piece 95 formed at the end of swing lever 96 pivoted at 97, which performs increasing oscillating movements its end opposite the forked piece being acted upon by the cams 99, 99a, 99b having bosses of increasing size formed on the rim of a disk 98 keyed on the shaft 26.

It will be apparent that when the cam 99 acts on the swing lever 96 the forked end of this latter will push the bar 91 backwards against the action of the spring 93 to such an extent that the rod 94 supporting the paper in the grooves 100 of the frame 22 allows the paper to slide down and stop on the next rod 94a of greater length.

The cam 99a being higher than the cam 99 will displace the oscillating lever 96 through a greater extent thus pushing the bar 91 further backwards and disengaging the bar 94a so that the paper will stop on the bar 94b.

When the photographs are completed the largest cam 99b comes into action which pushes away the rod 94b and causes the exposed paper to fall into a corresponding crate 11.

The swing lever 96, as clearly shown by the drawings, also pushes backward, by means of the fork 95, a pad 101 subjected to the action of a spring 102 and adapted to press the well stretched paper against the movable frame 22 during exposure.

Figs. 11, 12 and 13 show the arrangement for causing the paper to fall from the crate 11 on the absorbing rollers 14 (Fig. 1) after the photographs have been taken. The lower ends 103 of the uprights of the crates 11 are connected by a cross piece 104 carrying centrally and backwardly a plate spring 105, the two ends of which are bent in such a way as to form two supports 106 and 106a for the lower edge of the paper sheet contained in the crate. The spring ends carry two rods 107 inclined backwards.

Figure 19:
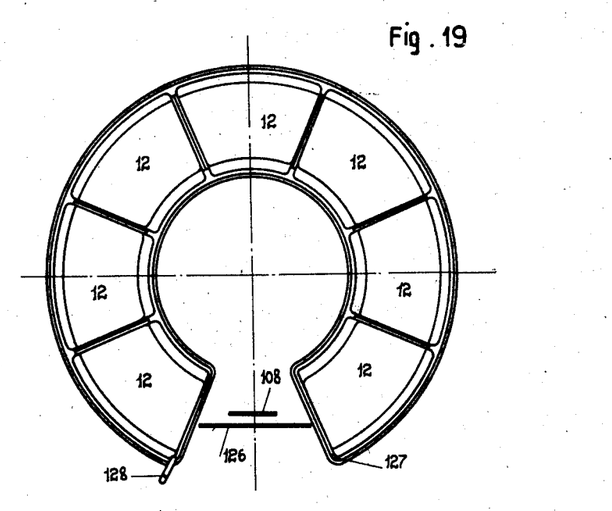
Fig. 19 is a plan view of the trays containing the solutions and the washing water.

In a free space of the annular portion wherein the eight trays 12 are arranged is fitted a yoke 108 on which the rods 107 strike when the crate 11 after dipping into all the trays successively is brought in front of the free space abovesaid. The rods 107 being inclined cause the ends 106 and 106a of the spring 105 to bend and come into the position indicated in dotted lines in Figs. 12 and 13. The stops 106 then let the paper fall from the crate 11 through the slot 126 (Fig. 19).

Figure 14:
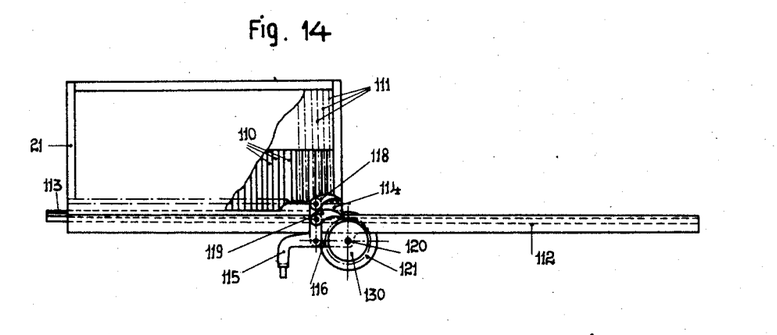
Fig. 14 shows the receptacle for the sensitive paper and its feeding device.

Referring to Fig. 14 showing the receptacle for the sensitive paper and its feeding mechanism, it will appear that said receptacle is constituted by a light-tight box 21, on the inner wall of which and along one half of its height are formed grooves 110 each of which receives and maintains in a vertical position a paper sheet 111. The bottom 113 of said box is fixed while its casing 21 is capable of sliding on guides 112. On one of the box outer sides is fitted a rack 114 the pitch of which corresponds to the distance between the grooves 110. A bell crank lever 115 pivoted on the fixed support 116 is raised by means of a cam 117 (Fig. 1) fitted on the shutter disk 25 when the sheet of paper has received the ninth exposure and the movable frame 22 returning into the position shown in Fig. 3 has allowed said sheet to fall on the underlying crate 11. The other end of the lever carries a pawl 118, which is thus obliged to push the rack 114 forward by one tooth.

As the buttom of the receptacle is fixed, it sets the last sheet free which thus falls into the movable frame 22. Underneath the pawl 118 is swivelled a pawl 119, which on each forward movement of the receptacle 21 and therefore every time a sheet falls down displaces the wheel 130 by one tooth, said wheel being connected by a rod 120 to a disk 121, carrying a graduated scale which through a slot may be read from the outside how many photographs have been taken and control the number of sheets still in the receptacle.

Figure 15:
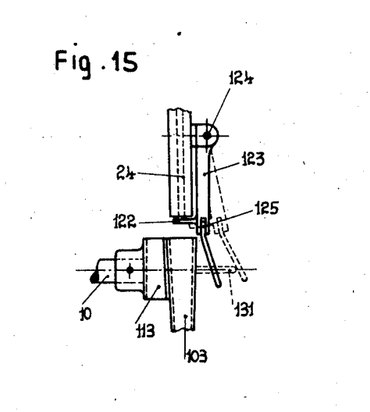
Figs. 15 and 16 show in front and side view respectively the arrangement delivering the exposed sheet to the crate carrying it to the photographic baths.
Figure 16:
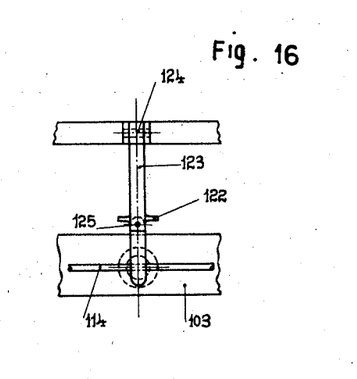
Figure 17:
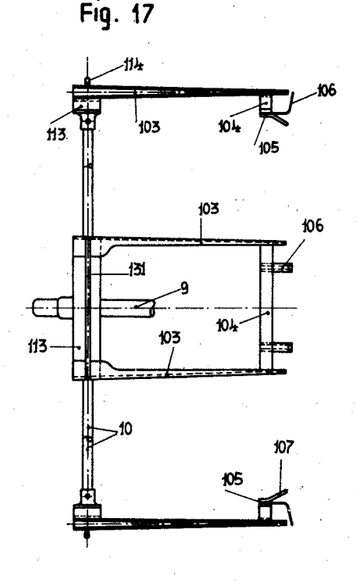
Figs. 17 and 18 are views of said crates at 90° to each other.
Figure 18:
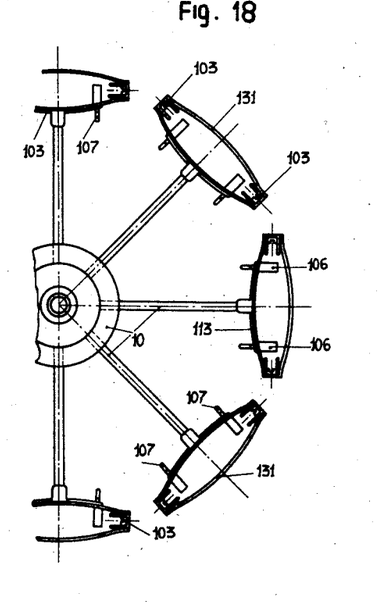

The crates 11 and spider 10 are shown on Figs. 17 and 18. Each crate consists of two uprights 103 connected at their upper and lower ends by two ties 104 and 113, these latter connecting each crate to the arms of the spider 10, while the ties 104 carry the spring device for causing the paper to fall from the crate as above described. Each crate carries an arcuated front bar of circular section 131, which opens the bottom of the guides 24 in order to let an exposed paper fall into the crate (Figs. 15 and 16).

The paper sliding in the guides 24 is in fact prevented from falling by the stop 122 carried by a lever 123 oscillating on the point 124, the lower end of which is transversally articulated by means of a hinge 125 and inclined outwards. When the bar 131 of a crate engages under said inclined surface it raises the oscillating lever 123 causing it to assume the position shown in dotted lines on Fig. 15 the stop 122 being also displaced and letting the paper fall into the crate. A suitable spring stop 126 holds the crate exactly under the guides 24 (Fig. 1).

Fig. 19 shows the arrangement of the trays 12 containing the photographic baths. According to the constructional form above described the trays are in the number of seven and in the place of the eighth tray a free space is left for a yoke 108 and a slot 126.

The circulation water is admitted at 127 into the jacket 34 adapted to maintain the baths at a constant temperature through a suitable heat regulator and the water is discharged at 128 through an overflow pipe.

Figure 20:
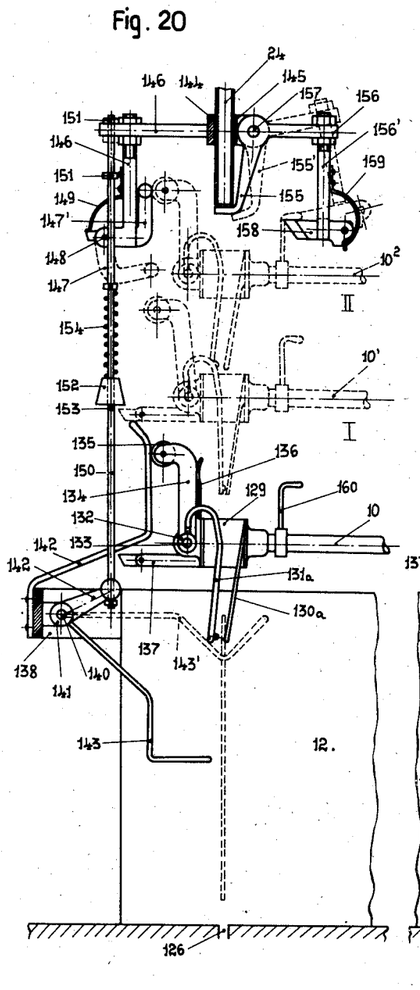
Figs. 20 and 21 are a side view partially in section and a front view of a modified form of the arrangement conveying the exposed paper to the various photographic baths.
Figure 21:
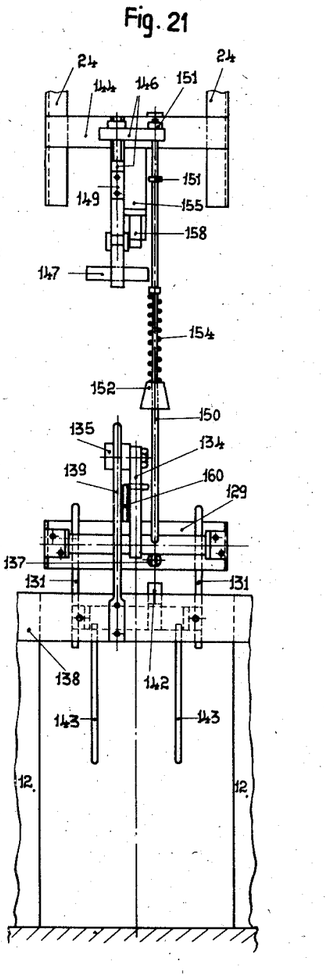

Referring to Figs. 20 and 21, I will now describe a modified construction of the devices conveying the exposed sheets of paper successively to the various photographic baths. A casing 129 is fitted on the end of each arm of the spider 10 (in the place of the crates 11) and within said casing are arranged two sets of small springs 130a and 131a serving as gripping means for the paper. Instead of being fixed as the springs 130, the springs 131a are fast with a hub 132 rotating on the pivot 133 and connected to a lever 134 bent at one end and provided with a roller 135. A plate spring 136 acts upon the lever 134 for the purpose of normally holding the spring 130a in contact with the springs 131a.

A lever 137 is connected to the casing 129 and ends by an articulated tooth transmitting the strains only in one direction, viz. upwards and not in the opposite direction.

A support 138 is arranged in the space between the first and last tray 12 and carries a rod 139 having a cam at its upper end and has a sleeve 141 turning on the pivot 140 on which are mounted a lever 142 and two supporting forks 143 suitably bent at their free ends.

The cross pieces 144 and 145 are secured in correspondence with the outer upper ends of the guides 24 for the sheets of exposed paper. The cross piece 144 carries by means of a suitable support 146 a bell crank lever 147, which rotates on the pivot 148 and is kept in its position of rest (shown in full lines) by a plate spring 149. A rod 150 passes at its upper end through a hole in the support 146 and is connected at its lower end to the lever 142. A stop 151 is arranged on the rod 150 and striking against the support 146 limits the upward movement of the rod 150. The rod is provided on its middle part with a frustrum-shaped loose sleeve 152, which is normally held against a fixed stop 151 of the rod by the action of a spiral spring 154.

A two-arm lever 156 is articulated to the cross piece 145 by means of a pivot 157 and is provided at one end with a nose 155, which abutting transversally the guides 24 normally prevents falling of the exposed paper sheets. A rod 156' is mounted at the other end of the lever 156 and carries at its free end a tooth having inclined surfaces 158 rotating on a suitable pivot and subjected to the action of a spring 159. Said tooth will remain in its position under the action of a strain directed upwards and will on the contrary oscillate under a strain in the opposite direction. The tooth is adapted to come into contact with a curved bar 160 mounted on the corresponding spider arm 10 of the machine.

The arrangement above described works as follows:

When the shaft 9 with the spider 10 is at its lower point (shown by a full line in the drawings) the unit is in the position in which after having dipped the exposed sheet into the various baths, the sheet is released and allowed to fall through the slot 126. In fact when the roller 135 of the lever 134 engages the cam 139 it causes a rotation of the hub 132 and therefore of the springs 131a, which receding apart from the springs 130a let the paper fall as desired.

When the shaft 9 begins its upward movement it causes the unit to pass successively through the positions shown by broken lines I and II. In the first of said positions the roller 135 has released the cam 139 and the lever 134 is returned by the spring 136 into its position of rest closing the gripping means.

At this moment the end of the lever 137 engages under the frustrum 152 carrying it along in its upward movement together with the rod 150, which causes a rotation of the lever 142 and the raising of the forks 143.

When the position II is attained, the stop 151 striking against the stop 146 stops the movement of the rod 150. The frustrum 152 however continuing its upward movement presses the spring 154. The lever 134 has meanwhile come into contact with the bell-crank lever 147 opening the gripping means while the curved rod 160 acting on the tooth 158 has caused the lever 156 to rotate on its pivot, thus disengaging the guides 24 from the stop 155. The paper sheet is thus free to fall passing along the springs of the gripping means which is open, and come into contact with the forks 143, which are maintained in a substantially horizontal position. From the position II the spider 10 is raised higher up until it reaches the end of its stroke and by this last upward movement the roller 135 disengages the bell crank lever 147 and the gripping means closes catching the fallen sheet at its upper end. The rod 160 sets the lever 156 free, which by its own weight carries the stop 155 again under the guides 24 in such a way as to prevent the next sheet to fall down.

At this time the spider 10 performs a horizontal displacement corresponding to ⅛ of a turn, as it has been illustrated with reference to the first constructional form, carrying the sheet held by the springs 130a and 131a to the first tray. This horizontal displacement withdraws the lever 137 from under the frustrum 152 allowing the unit comprising the rod 150, stop 151, lever 142, fork 143 to return by virtue of their own weight to the normal position while the bell crank lever 147 is returned by the spring 149 into its initial position.

The place of the arm 10 that has been displaced is now occupied by the adjacent arm carrying between its springs 130a and 131a a sheet of paper that has already been treated in the various baths and is to be conveyed to the drying apparatus.

The spider will then begin its downward movement; the rod 160 strikes in the opposed direction the tooth 158, which oscillates without displacing the stop 155 on its pivot and is returned to its normal position by the spring 159. The arm 10 is free to continue its downward movement and when the end of the lever 137 strikes against the frustrum 152 it oscillates being articulated as above described until it reaches the position shown in the drawings with full lines in which the gripping means is opened and allows the sheet of paper to fall down and be conveyed to the drying apparatus.

It is to be understood that the number of exposures, nine in the described construction, may vary at will for instance for the purpose of obtaining exposures of different sizes though using sensitive paper of the same size and also for the purpose of reducing the size of this latter and of the operating members. The machine may also be used for effecting enlargements of any of the nine photographs.

It will be seen that the shutter, which in the illustrated construction is in the shape of a disk provided with slots, may also be constituted by a plurality of movable shutter elements of known construction or other similar arrangement.

Should it be desired to take automatically the successive photographs, instead of provoking the exposures by means of the push button 58, it will be sufficient to do away with some members, for instance the stops 61 mounted on the shutter 25 in order to effect said operations in a continuous manner. The process may be carried out in the practice by keeping the switch 58 in the depressed position.

It may be convenient, particularly in the countries where great variations in temperature take place, to provide suitable means for maintaining the chemical solutions in the trays 12 substantially at a constant temperature, of about 20° C. For this purpose, when a predetermined quantity of water has been supplied into the series of tanks 3 an electrical heating resistance will be put into the circulation, said resistance being controlled e. g. by a heat regulator surrounded by the water and adapted to allow only very small differences in temperature. The machine according to this invention may also be used when it is desired to obtain first the negative image and then the positive copy on two distinct sheets; the means adapted for this purpose being easily applied. The machine may further be used, as it has already been said, to make enlargements of the best photographs previously obtained.

What I claim is:

1. In an automatic photographic apparatus, in combination, with a plate receptacle, a plate-carrying frame, an objective, and means for transferring the plates one at a time from said receptacle to said frame, of means for displacing the plate frame behind the objective in a direction for making a row of photographs on the plate, means for displacing the plate stepwise in the plate frame in a direction perpendicular to the aforesaid direction to make further rows of photographs parallel to the former, means for developing the exposed plate, and means for delivering the developed plate.

2. In an automatic photographic apparatus, in combination with a plate receptacle, a plate-carrying frame, an objective, and means for transferring the plates one at a time from said receptacle to said frame, of means for displacing the plate frame stepwise behind the objective in a direction to make a row of photographs on the plate, means for displacing the plate stepwise in the plate frame in a direction perpendicular to the former direction for making further rows of photographs parallel to the first row on the same plate, baths for developing and reverting the exposure from negative into positive, means for successively passing the exposed plate in said baths, and means for drying and delivering the developed plate.

3. In an automatic photographic apparatus, in combination, an objective, a plate receptacle, a plate-carrying frame movable behind the objective, means for transferring the plates one at a time from the receptacle to the plate frame, an electric motor, a rotating member for displacing said plate frame stepwise in a direction actuated by said motor, an excitation circuit for said motor, switch means for said circuit, means for supporting a plate at different heights in the plate frame, said means being actuated by said motor so as to displace said plate stepwise in the plate frame in a direction perpendicular to the direction of the plate frame displacement when the plate frame has reached the end of its stroke, means on the rotating member for opening the switch at the end of the displacements of the plate frame and of the plate carried by the latter, baths for developing and reverting the exposure from positive into negative, a member adapted to receive from said motor simultaneous translation and rotation movements, supporting means in said member for receiving from the plate frame said exposed plate and dipping it successively into said developing and reverting baths, and means actuated by said motor for drying and delivering the developed plate.

4. In an automatic photographic apparatus, in combination, an objective, a receptacle for plates to be exposed, a plate frame movable behind the objective, means for transferring the plates one at a time from the receptacle to the plate frame, an electric motor, a rotating member for displacing said plate frame step-wise in one direction, an automatic friction coupling for connecting said member with said motor, an excitation circuit for said motor, switch means for controlling said circuit, a relay controlling the angular displacement of said rotating member, an excitation circuit for said relay comprising a hand-operated switch for taking at will the photographs, means for supporting a plate at different heights in the plate frame, said means being actuated by said motor so as to displace said plate stepwise in the plate frame in a direction perpendicular to the direction of the plate frame displacement when the plate frame has reached the end of its stroke, means on the rotating member for opening the switch at the end of the displacement of the plate frame and of the plate carried by the latter, baths for developing and reverting the exposure from positive into negative, a member adapted to receive from said motor simultaneous translation and rotation movements, supporting means in said member for receiving from the plate frame said exposed plate and dipping it successively into said developing and reverting baths, and means actuated by said motor for drying and delivering the developed plate.

5. In an automatic photographic apparatus, in combination, an objective, a plate carrying frame, a receptacle for the plates comprising a fixed bottom and movable sides, a pawl mechanism for displacing said sides together with the plates in the receptacle so as to allow the plates to fall one at a time into said plate frame, means for displacing the plate frame stepwise behind the objective in a direction for making a row of photographs on the plate, means for displacing the plate in the plate frame stepwise in a direction perpendicular to the former for making further rows of photographs parallel to the former row, means for developing the exposed plate, and means for delivering the developed plate.

6. In an automatic photographic apparatus, in combination, an objective, a plate frame, a spring for actuating the latter, a receptacle for the plates comprising a fixed bottom and movable sides, a pawl mechanism for displacing said sides together with the plates carried by the receptacle so as to allow the plates to fall one at a time into said plate frame, an electric motor, a friction coupling, a shaft rotated by said motor through said coupling, a disk on said shaft having projections for successively pushing said frame stepwise in a direction against the action of said spring, and stop members for holding said frame in its new position for making a row of photographs on the plate, an oscillating stepped support of increasing width for supporting the plate in the frame, a cam carried by said shaft for oscillating said support and causing said plate to fall by one step, means in said disk for releasing the plate frame successively from said stop members in order to displace the frame in an opposite direction under the action of said spring for making a row of photographs above the first row and so on, means for releasing the exposed plate from the frame at the end of the exposure and for actuating said pawl mechanism to cause a fresh plate to fall into the frame when said disk has performed one turn, gripping members for receiving the exposed plate, developing baths, and means for successively dipping said plate carried by said gripping members into said baths and successively drying and delivering said developed plate.

7. In an automatic photographic apparatus, in combination, an objective, a plate frame, a receptacle for the plates to be exposed, means for transferring said plates one at a time from said receptacle into said plate frame at the end of the exposure of a plate, means for imparting an alternating stepwise translation movement to said plate frame and a stepwise translation movement to the plate in the plate frame in a direction perpendicular to the plate frame movement at the end of each stroke of the plate frame in order to make superposed rows of photographs on the plate, a motor for actuating said means, a shaft receiving from said motor an alternating translation movement and simultaneously an intermittent rotary motion, a spider carried by said shaft, gripping members at the ends of the spider arms for receiving the exposed plate from the plate frame, cam devices for opening and closing said gripping members at predetermined points, photographic baths arranged about said shaft so that the exposed plate supported by said gripping member is successively immersed into said photographic baths and then released, a pair of drying rolls actuated by said motor between which the developed plate is passed, a feeding mechanism for bringing the plate to an outlet, and means for drying said plate while it is on said feeder.

8. In an automatic photographic apparatus, in combination, with a plate receptacle, a plate frame, an objective, and means for passing the plates one at a time from the receptacle to the frame, means for displacing the plate frame stepwise behind the objective in a direction for making a row of photographs on the plate, means for displacing stepwise the plate in the plate frame in a direction perpendicular to the former for making on the same plate further rows of photographs parallel to the first row, said translating means coming into action alternatively, developing and reverting baths arranged in a circular row underneath the plate frame, a water jacket surrounding said baths for keeping them at a predetermined temperature, means for bringing the exposed plates successively into said baths, and means for drying and delivering the developed plate.

9. In an automatic photographic apparatus, in combination with an objective, a plate-carrying frame and an actuating electric motor, an automatic friction coupling, a rotating member for displacing said plate frame stepwise in the opposite directions, said rotating member being actuated by said motor through said automatic friction coupling, an excitation circuit for said motor, a relay controlling said circuit, a second relay controlling the angular displacement of said rotating member, means for supporting a plate at different heights in the plate frame, said means being operated by said rotating member so as to displace the plate in the frame stepwise in a perpendicular direction when the plate frame has reached the end of its stroke in either of said directions, means carried by said rotating member for de-energizing said control relay of the motor at each turn of said member, means actuated by said rotating member for keeping the motor circuit closed when the control relay is de-energized, photographic baths arranged in a circular row underneath said plate frame, a member adapted to receive from said motor simultaneous translating and rotating movements, said member being situated in the middle of said circular row of baths, gripping devices in said member for receiving the exposed plate from the plate frame and dipping it successively into said photographic baths, means actuated by said motor for drying and delivering the developed plate, and a pawl mechanism actuated by said translating and rotating member for breaking the motor circuit when the exposed plate has been delivered.

In testimony that I claim the foregoing as my invention, I have signed my name.

MARIO BACINO.